Nov. 14, 1967   C. E. KEHKE   3,352,014

OPTICAL METHOD OF HULL MEASUREMENT

Filed July 21, 1965

INVENTOR.
CLARENCE E. KEHKE
BY
William C. Babcock
ATTORNEY

United States Patent Office 3,352,014
Patented Nov. 14, 1967

3,352,014
OPTICAL METHOD OF HULL MEASUREMENT
Clarence E. Kehke, 12511 Pleasant Place,
Garden Grove, Calif. 92641
Filed July 21, 1965, Ser. No. 473,688
3 Claims. (Cl. 33—1)

The present invention relates generally to ship building and ship maintenance, and more particularly to a method of checking the tolerance of a hull of circular cross section as to the eccentricity thereof.

As is well known, the hull of a submarine must be circular within close tolerances in order to withstand the external pressure to which it will be subjected. In the past, the circularity of a hull has been checked by an internal sweep gauge.

However, there are a number of operational disadvantages in the use of such a sweep gauge. In the construction of a new submarine, for example, equipment and platforms may not be installed until after the hull sections are welded together. The hull sections after welding must be checked for circularity. When a sweep gauge is used, the checking operation is carried on within the hull, and this delays the installation of equipment and platforms that would interfere with the use of the sweep gauge. By the use of the method herein described, there are no measurements made inside the hull, and the installation of platforms and equipment may proceed immediately after the sections are welded together, with a consequent saving in time.

A major object of the invention is to provide a method of determining the accuracy of the circularity of a hull at a number of locations along the length thereof, which calculations may be made without interfering with the installation of equipment and platforms in the interior of the vessel.

Another object of the invention is to furnish a method of determining the accuracy of the circularity of a hull that is simple and easy to carry out, may be performed with relative rapidity, and when used, results in a substantial saving in construction costs as well as permitting the circularity of the hull to be easily checked after a deep dive.

Figure 1:
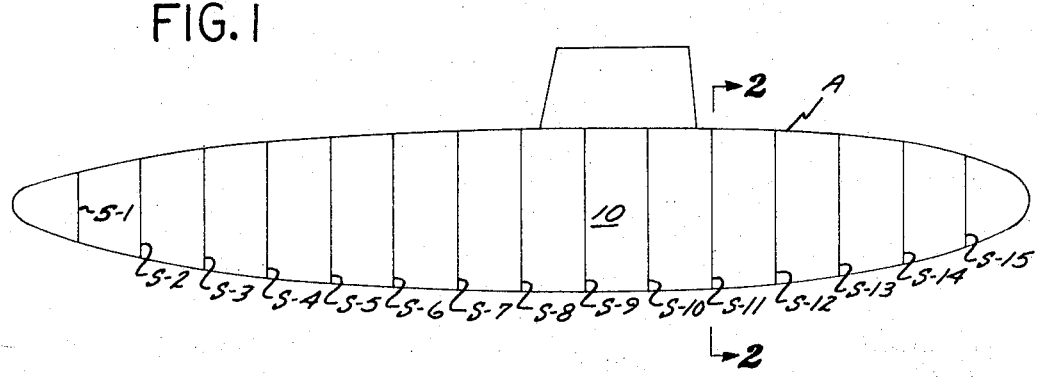
Figure 2:
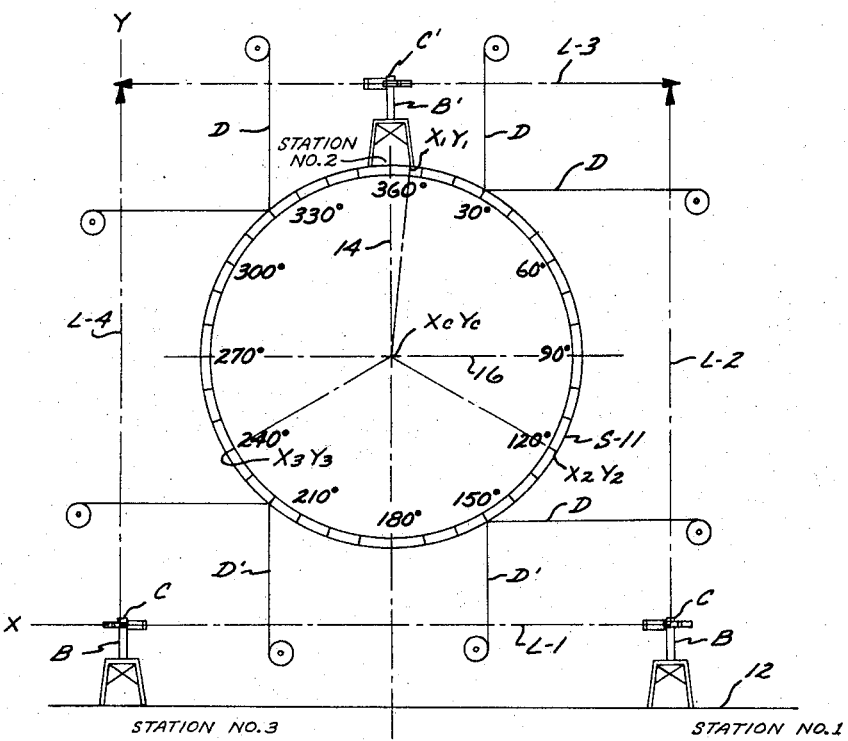

These and other objects and advantages of the invention will become apparent from the following description thereof, and from the accompanying drawing illustrating the same, in which:

FIGURE 1 is a side elevational view of a submarine, with a number of longitudinally spaced sections marked on the hull at which the accuracy of the circularity thereof is to be determined; and FIGURE 2 is a transverse cross section of the hull at line 2—2 of FIGURE 1, schematically showing the instruments and method of using same to determine the accuracy of the circularity of the hull at each of said sections.

A submarine A, the hull 10 of which is to be checked for circularity at sections S–1 to S–15, is shown in FIGURE 1, and is supported above a kood surface 12 by conventional means. The apparatus utilized in carrying out the method of the present invention comprises two alignment telescopes with striding levels B and B', two double sphere optical square attachments C and C', two twenty-five foot tapes D and D', calibrated to $\frac{1}{32}$", and a pair of dividers (not shown).

The sections S–1 to S–15 to be checked are marked by conventional means on the exterior surface of the hull 10. The chordal distance between 5° increments is computed for each of the sections S–1 to S–15 (.08724 times the outer hull radius) and marked off on the section circle by means of dividers, starting at vertical and horizontal center lines 14 and 16, respectively. To minimize error, it is preferable that none of these markings be continued consecutively over more than 45° of a hull section.

The alignment telescope B and optical square attachment C is set up at station No. 1 in vertical alignment with the particular section S–1 to S–15 to be checked. With the instruments so set up at station No. 1, a part of an optical square may be generated that includes a horizontal line of sight L–1 below the hull 10 and an upwardly extending vertical line of sight L–2 on the starboard side of the vessel, as viewed in FIGURE 2. These lines of sight can be positioned at any convenient distance from the hull 10. The second alignment telescope B' is supported on the upper portion of hull 10 at a desired fixed position thereon. Telescope B', when so disposed, can provide a third line of sight L–3 that is horizontal and parallel with line of sight L–1.

Horizontal measuremetns are then taken with tape D to the nearest $\frac{1}{32}$" from each 5° increment on the starboard side of the hull 10, as shown in FIGURE 2, to the line of sight L–2. This operation is illustrated in FIGURE 2 wherein horizontal measurements are shown being made with the tape D at 30° and 150° increments on the section S–11 by use of the alignment telescope B and square attachment C located at station No. 1. The vertical distance of each 5° increment from 90° to 270° to line of sight L–1 may be made by the use of the alignment telescope B when it is disposed at station No. 1 in conjunction with tape D'.

In FIGURE 2 the tape D' is shown as being used at the 150° and 220° increment marks on hull 10 to determine the distance thereof above line of sight L–1. The vertical distances of the 5° increments from 270° to 90° on the section S–11 to line of sight L–3 may be made by alignment telescope B' at station No. 2 in conjunction with tape D, as illustrated in FIGURE 1. All of the horizontal and vertical distance measurements so made at the 5° increments are recorded in a suitable tabulation for future use, as will later be explained.

The alignment telescope B and optical square attachment C are then moved to the port side of the hull 10 (FIGURE 2) to station No. 3, which is the same horizontal distance from center line 14 as station No. 1. With telescope B and optical square attachment C at station No. 3, a vertical line of sight L–4 can be provided to complete the optical square. The term optical square is used conveniently to designate the lines L–1, L–2, L–3 and L–4. However, the lines L–1 to L–4 need not actually define a square, for if the lines provide a rectangle the method may be carried out equally successfully. However, it is essential that lines L–1 and L–3 be parallel to one another, and that lines L–2 and L–4 be parallel. The term optical square will include both a square and a rectangle. The line of sight L–4 permits horizontal distances to be determined therefrom to each of the 5° increments in the section S–11 of hull 10 from 180° to 360°. The operation just described is performed successively on each of the sections S–1 to S–15.

The measurements secured in the manner described are used by either plotting the readings directly on a previously established grid on a loft floor, or by entering the information into a computer to calculate the eccentricity of one of the sections S–1 to S–15 from a mean circle of the submarine hull 10, by averaging a three-point fit of circles past successively through each increment and two other increments. The two other increments are one-third of the circumference about the hull 10 from the starting increment, and two-thirds minus 5° from the starting increment.

Before the measurements at each of the 5° increments can be used in the computer, the same must be converted to X and Y coordinates, with the X axis being the line of sight L-1 and the Y axis being the line of sight L-4. Three of the 5° increments spaced as described, are shown in FIGURE 2 of the drawing, with the coordinates at each of these increments being identified by the notations $X_1 Y_1$, $X_2 Y_2$, and $X_3 Y_3$. Using this set of coordinates, coordinates $X_c Y_c$ for the center of the mean circle may be determined, as well as the radius R thereof. Moving in a clockwise direction about the hull 10, the above described operation is carried out for each of the 5° increments thereon. The coordinates $X_c Y_c$ are obtained by direct substitution as follows:

$$(X_1-Xc)^2+(Y_1-Yc)^2=R^2 \quad (1)$$
$$(X_2-Xc)^2+(Y_2-Yc)^2=R^2 \quad (2)$$
$$(X_3-Xc)^2+(Y_3-Yc)^2=R^2 \quad (3)$$

Subtracting the third from the first equation yields:

$$X_1^2-X_2^2+2XC(X_2-X_1)+2Yc(Y_2-Y_1)+Y_1^2-Y_2^2=0 \quad (4)$$

Substracting the third from the first equation yields:

$$X_1^2-X_2^2+2Xc(X_3-X_1)+2Yc(Y_3-Y_1)+Y_1^2-Y_3^2=0 \quad (5)$$

Let $$t_1=X_2-X_1$$
$$t_2=X_3-X_1$$
$$t_3=X_1^2-X_2^2+Y_1^2-Y_2^2$$
$$t_4=X_1^2-X_3^2+Y_1^2-Y_3^2$$
$$t_5=Y_2-Y_1$$
$$t_6=Y_3-Y_1$$
$$t_7=t_1t_6-t_2t_5$$

Then solving Equations 4 and 5 produces:

$$Yc=\frac{t_2t_3-t_1t_4}{2(t_1t_6-t_2t_5)}$$

and $$Xc=\frac{t_4t_5-t_3t_6}{2(t_1t_6-t_2t_5)}$$

Substituting in 1 gives:

$$R=\sqrt{(X_1-X_c)^2+(Y_1-Y_c)^2}$$

and from these, the radius R can be computed. With the above figures, the average value of the coordinates $X_c Y_c$ can be computed, as well as the average value for the radius R. The eccentricity of the hull 10 at any one of the 5° increments on any one of the sections S-1 to S-15 can thereafter be determined by comparing the R computed for that increment with the average R for that section. The alignment telescope B and optical square attachment C mentioned herein are each commercially available, and no detailed structure thereof need be given. The method of determining the eccentricity of one of the sections S-1 to S-15 inclusive has been previously described in detail and need not again be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. A method of determining the eccentricity of a plurality of longitudinally spaced sections of a circular hull at a plurality of equally spaced increments on each of said sections, including the steps of:
   (a) defining said sections by making a plurality of circumferentially extending lines on the exterior surface of said hull;
   (b) dividing each of said lines into a plurality of increments of equal length, with each of said increments being defined between two points marked on said line;
   (c) successively defining a transverse optical square about said hull at each of said sections that extends therethrough;
   (d) determining the horizontal and vertical distances of each of said points on one of said lines from one side of said optical square;
   (e) determining the radius of each of said points on said hull from said measured vertical and horizontal distances;
   (f) determining the average radius of each of said sections; and
   (g) comparing said radius at each of said points with said average radius to determine the eccentricity of said hull at a particular location thereon.

2. A method as defined in claim 1, which includes plotting said vertical and horizontal distances at spaced positions on a graph and visually comparing the position thereof to that of the position of said average radius which is also drawn on said graph.

3. A method as defined in claim 1, which includes plotting said radius for each of said points on a graph on which a plurality of circumferentially spaced, radially extending lines are defined, with a circle of said average radius, and the eccentricity of each of said points on said hull being visually indicated on said graph by the deviation in position therefrom from said circle.

No references cited.

SAMUEL S. MATTHEWS, *Primary Examiner.*

UNITED STATES PATENT OFFICE
CERTIFICATE OF CORRECTION

Patent No. 3,352,014　　　　　　　　　November 14, 1967

Clarence E. Kehke

It is hereby certified that error appears in the above numbered patent requiring correction and that the said Letters Patent should read as corrected below.

Column 1, line 60, for "kood" read -- floor --; column 2, line 18, for "measuremetns" read -- measurements --; column 3, line 16, for "third" read -- second --; line 17, for "2XC" read -- 2Xc --.

Signed and sealed this 11th day of March 1969.

(SEAL)
Attest:

Edward M. Fletcher, Jr.　　　　　　　　EDWARD J. BRENNER
Attesting Officer　　　　　　　　　　　Commissioner of Patents